United States Patent

Thota

(10) Patent No.: US 7,421,429 B2
(45) Date of Patent: Sep. 2, 2008

(54) GENERATE BLOG CONTEXT RANKING USING TRACK-BACK WEIGHT, CONTEXT WEIGHT AND, CUMULATIVE COMMENT WEIGHT

(75) Inventor: Chandrasekhar Thota, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 466 days.

(21) Appl. No.: 11/197,067

(22) Filed: Aug. 4, 2005

(65) Prior Publication Data

US 2007/0038646 A1 Feb. 15, 2007

(51) Int. Cl.
G06F 17/30 (2006.01)
G06F 17/00 (2006.01)
(52) U.S. Cl. .............. 707/7; 707/1; 707/10; 707/104.1; 706/45
(58) Field of Classification Search ............... 707/1, 707/3, 6–7, 10, 100–102, 104.1, 200, 204; 706/45–50; 725/112; 709/203, 219–220
See application file for complete search history.

(56) References Cited

U.S. PATENT DOCUMENTS

| 6,272,507 B1 | 8/2001 | Pirolli et al. |
| 6,539,377 B1 | 3/2003 | Culliss |
| 6,591,261 B1 | 7/2003 | Arthurs |
| 6,751,612 B1 | 6/2004 | Schuetze et al. |
| 2003/0225763 A1 | 12/2003 | Guilak et al. |
| 2005/0060168 A1 | 3/2005 | Murashige et al. |
| 2005/0234904 A1* | 10/2005 | Brill et al. ............ 707/5 |
| 2005/0278297 A1* | 12/2005 | Nelson .............. 707/1 |
| 2006/0004691 A1* | 1/2006 | Sifry ................ 707/1 |
| 2006/0053156 A1* | 3/2006 | Kaushansky et al. ....... 707/102 |
| 2006/0069663 A1* | 3/2006 | Adar et al. ............ 707/1 |
| 2006/0284873 A1* | 12/2006 | Forrest et al. ........... 345/440 |
| 2006/0287989 A1* | 12/2006 | Glance ............... 707/3 |
| 2007/0073667 A1* | 3/2007 | Chung ............... 707/3 |
| 2007/0214097 A1* | 9/2007 | Parsons et al. .......... 706/12 |

FOREIGN PATENT DOCUMENTS

| GB | 2399195 | 8/2004 |
| WO | WO2005/019994 | 3/2005 |
| WO | WO2005/029367 | 3/2005 |
| WO | WO 2006/009385 | * 1/2006 |

(Continued)

OTHER PUBLICATIONS

Ko Fujimura et al. "The eigenrumor algorithm for ranking blogs", WWW 2005, May 2005, 6 pages.*

(Continued)

*Primary Examiner*—Srirama Channavajjala
(74) *Attorney, Agent, or Firm*—Amin, Turocy & Calvin, LLP

(57) ABSTRACT

A mechanism of ranking weblog or "blog" items is provided. More particularly, the subject ranking mechanisms can facilitate ranking blog feeds and blog items contained therein thus focusing and intelligently delivering content (e.g., blog items) to users. The subject innovation facilitates ranking the blog feeds and blog items by creating a context rank around each blog feed. The context rank represents a sum of a context weight, a track-back weight and a comment weight. Accordingly, this context rank can allow readers to sort blog items in the order of popularity or importance thus effectively reducing content noise.

11 Claims, 12 Drawing Sheets

FOREIGN PATENT DOCUMENTS

WO  WO 2007/033202  *  3/2007

OTHER PUBLICATIONS

Gilad Mishne, "Multiple ranking strategies for opinion retrieval in Blogs", The university of Amsterdam at the 2006 TREC Blog Track, 4 pages.*

Kangmiao Liu et al. "Ranking using multi-features in Blog Search", PCM 2007, LNCS 4810, pp. 714-723, 2007.*

Hiroshi Kori et al. "Ranking of regional Blogs by suitability sonification", proceedings of the 22$^{nd}$ International conference on Data Engineering workshops, 2006, pp. 117-121.*

Fujimora, Ko, et al.; The EigenRumor Algorithm for Ranking Blogs; May 2005; 6 pages; Chiba, Japan.

Article Alley; New Search Engine Ranking Algorithm http://www.articlealley.com/article_1755_6.html; last viewed Oct. 27, 2005.

BlogPulse; About BlogPulse http://www.blogpulse.com/about.html#search; last viewed Oct. 27, 2005.

Technorati http://beta.technorati.com/about/; last viewed Oct. 27, 2005.

Gulli, A.; The Anatomy of a News Search Engine; May 2005, 2 pages, Chiba, Japan.

Cuenca-Acuna, et al.; PlanetP: Using Gossiping to Build Content Addressable Peer-to-Peer Information Sharing Communities; Content Search and Retrieval.

* cited by examiner

GENERATE BLOG CONTEXT RANKING USING TRACK-BACK WEIGHT, CONTEXT WEIGHT AND, CUMULATIVE COMMENT WEIGHT

BACKGROUND

A weblog, most often referred to as a "blog" is a web-based publication consisting most frequently of periodic articles. Effectively, blogs enable web-based communities to exist, share ideas and communicate with regard to a wide variety of topics. The articles are most often arranged in reverse chronological order (e.g., the most recent appearing first). Conventionally, weblogs, or blogs, were manually created and updated. However, with the increase in popularity, recent developments have emerged that include tools that facilitate automating the creation and/or maintenance of blogs.

Today, the range of categories of blogs are countless. For instance, blog content topics can range from geographically focused topics and points of interest to political topics. Political candidates and supporters often use blogging mechanisms and sites to reach out to other fellow supporters. The scope of topics is endless.

While some blogs are written by a solo author, others are written by a group of authors. Sometimes the blog is interactive (e.g., allowing a visitor or reader to leave a public and/or private comment). On the other hand, sometimes, they are not interactive effectively operating as an way to disperse information.

Traditionally, a blogger would employ a personal software package to assist in creating a blog. Today, the availability of blog hosting sites and Web services to provide editing via the Web has proliferated. As well, blog generation tools have continued to evolve and emerge to provide the blogger with greater flexibility and power in creating a blog.

Today, with the increased popularity, blogging has essentially combined a personal web page with tools to make linking to other pages easier. More particularly, track-backs, as well as comment are common mechanisms of blogs thus increasing penetration and interest. With these mechanisms, virtually any reader or visitor to a blog is able to participate by posting a comment or linking from an external blog (e.g., track-back).

Generally, a track-back is a mechanism that represents a first blog that is referenced in a second blog whereas a link to the first blog is provided in the second blog. For example, a blog can provide track-backs to other blogs of a similar topic or to other blogs that the blogger may think provide relevant information to a specific blog community.

A comment is a mechanism that permits a reader or visitor to post a remark, thought or opinion on a particular topic or thread. The comments increase the interactivity and participation of a particular blog. For example, readers can post answers to questions, opinions on topics, etc.

With the increase in popularity comes an increase in content volume. As such, blog readers are often inundated with blog items relating to a subject or topic. Currently, no effective manner of rating, filtering and/or focusing blog items to a user are available. Today, blogs are rated solely upon the popularity of the author. Therefore, a user is forced to sift through the voluminous number of blog items with hopes to locate items of interest.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The invention disclosed and claimed herein, in one aspect thereof, comprises a system and methodology for ranking a weblog or "blog." More particularly, the subject ranking mechanisms can facilitate ranking blog feeds and blog items contained therein thus focusing and intelligently delivering content (e.g., blog items). Blogs are the content published on the internet by free-lance individuals with no affiliation to any content oriented organizations (e.g., newspapers, magazines etc). A reader can subscribe to blog content using simple syndication feeds. The subject innovation facilitates ranking the blog feeds and blog items by creating a context rank around each blog feed. Accordingly, this ranking mechanism can allow readers to sort blog feeds in the order of popularity or importance thus effectively reducing content noise.

One novel feature of the subject blog ranking and/or filtering mechanism is to identify and deliver the most relevant information to a user. In one aspect, a user can employ algorithms to generate a blog context rank. More particularly, for each blog item received, a generic weighted context can be created by identifying location of the blog, category of the blog and other contextual information such as freshness (e.g., date published), language, etc. An equivalent weight for this generic context can be calculated using the following algorithm.

For each track-back of the blog item an associated weight can be calculated. It will be appreciated that a track-back is a link to the blog item from an external web site. Similarly, for each comment on the blog item, a pre-calculated weight can be assigned and a cumulative comment weight can be calculated for the blog item at the end.

The above three components, context weight component, track-back weight component and comment weight component can generate the blog context rank. The blog context rank can be employed to sort the blog items to "bubble up" importance and/or popularity.

In yet another aspect thereof, an artificial intelligence component is provided that employs a probabilistic and/or statistical-based analysis to prognose or infer an action that a user desires to be automatically performed. Additionally, still another aspect can employ rules-based logic to effect implementation of ranking, sorting and/or filtering of blog items.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION

Figure 1:
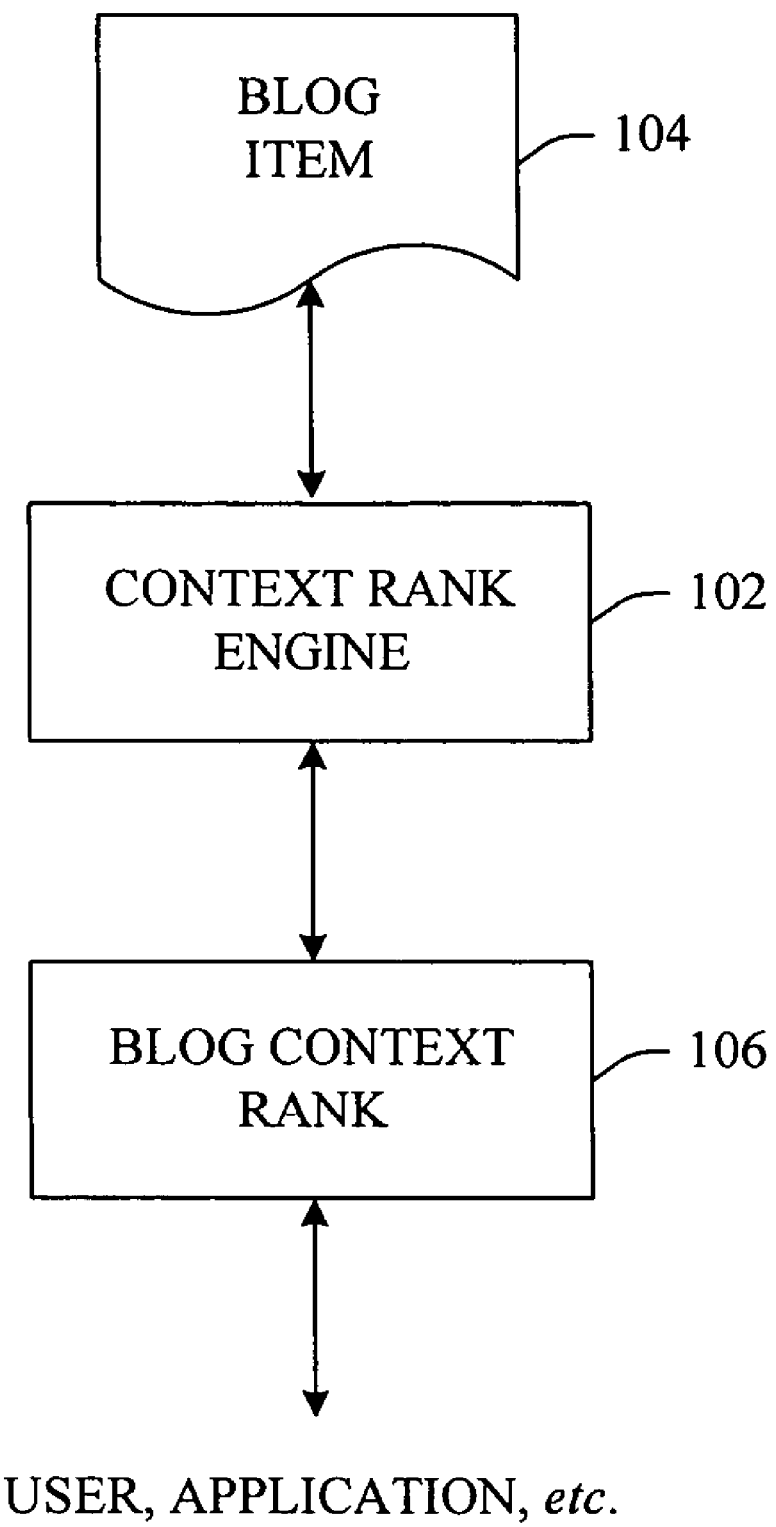
FIG. 1 illustrates a general component block diagram of a system that generates weblog ("blog") item context rank in accordance with an aspect of the subject innovation.

The invention is now described with reference to the drawings, wherein like reference numerals are used to refer to like elements throughout. In the following description, for purposes of explanation, numerous specific details are set forth in order to provide a thorough understanding of the subject invention. It may be evident, however, that the invention can be practiced without these specific details. In other instances, well-known structures and devices are shown in block diagram form in order to facilitate describing the invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to FIG. 1, a system 100 that facilitates ranking blog content in accordance with one aspect of the innovation is shown. Generally, FIG. 1 includes a context rank engine component 102 that receives a blog item 104 and generates a blog context rank 106. Essentially, the context rank engine component 102 can facilitate ranking and subsequently filtering blog content. Individual mechanisms and methodologies of ranking and filtering will be better understood upon a review of figures that follow.

Figure 2:
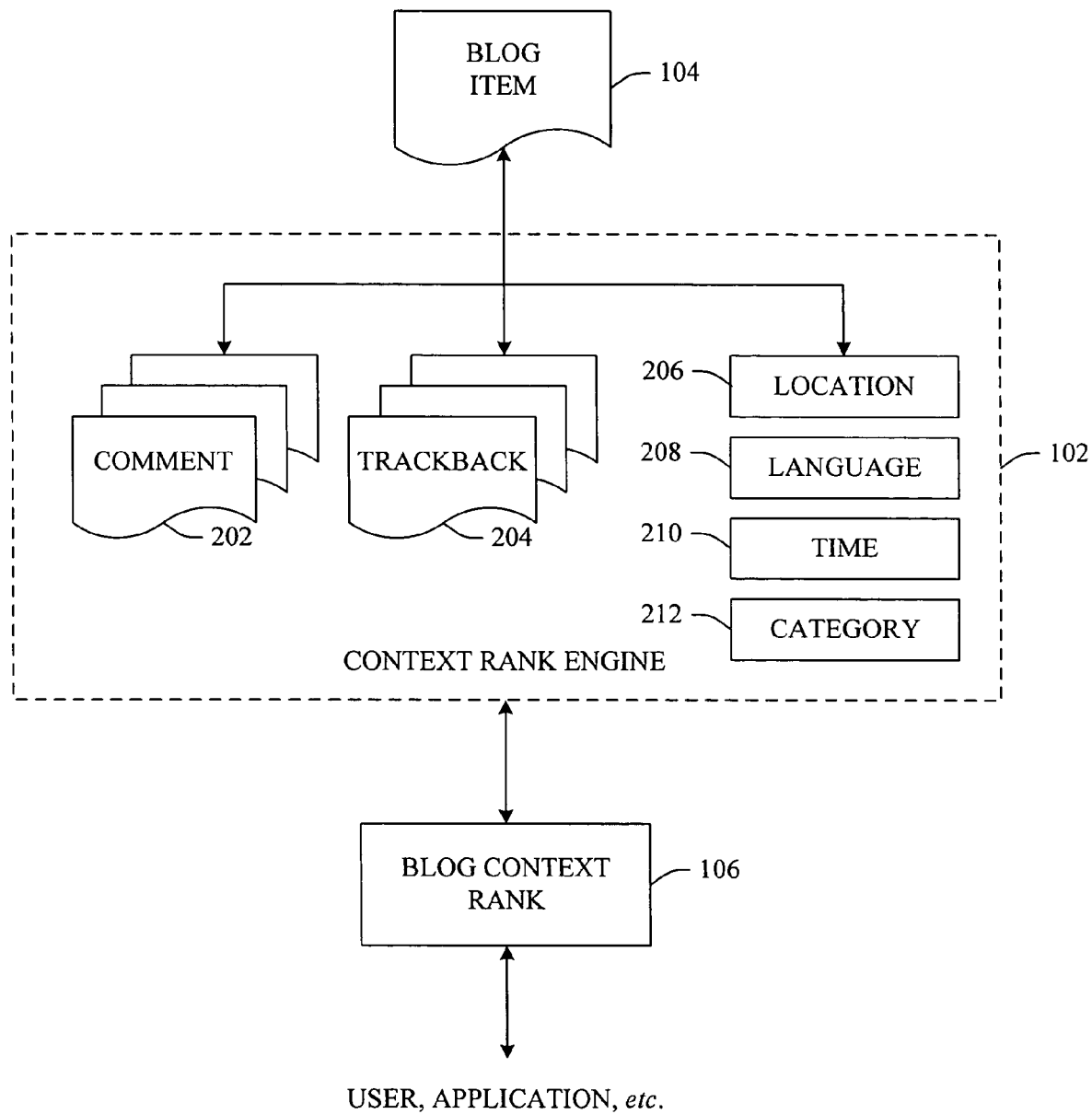
FIG. 2 illustrates an exemplary architectural diagram of a system that employs comments, track-backs, and contextual criteria to facilitate a context rank.

Blog item 104 is representative of any individual or grouping of blog item feeds. It will be appreciated that the blog item 104 can be manually or automatically fed into the context rank engine component 102. In one aspect, a crawler can be employed to fetch blog feeds (e.g., blog item 104) from a number of disparate blogs. Accordingly, the context rank engine component 102 can be employed to generate a relevant blog context rank 106 based upon any desired criteria. In one example, the context rank engine component 102 can factor in criteria including, but not limited to, location, temporal criteria, language, comments, track-backs, etc. FIG. 2 below illustrates an exemplary list of criteria that can be employed by the context rank engine component 102 to generate a blog context rank 106.

One novel feature of the subject blog ranking and/or filtering mechanism is to identify and deliver the most relevant information to a user. As will be described in more detail below, users oftentimes have very little time to sift through voluminous amounts of content. Rendering content based upon the popularity of each item would assist in time management thereby increasing efficiency.

As described above, blogs are content published on the internet by free-lance individuals with no affiliation to any content oriented organizations (e.g., newspapers, magazines). A reader can subscribe to blog content using simple syndication feeds thereby, blog items can be automatically fed to the subscriber. A collection of such subscribed feeds are oftentimes called blog-rolls and expressed in simple outline processor markup language (OPML) format. While a number of software products are available today to consume an OPML document to display subscribed blog content, these software products and applications do not provide any recommendations on what content is important or popular to the reader. Due to the lack of such a blog ranking system it becomes over-whelming and time-consuming for readers to search through each and every blog feed and each and every blog item associated therewith.

The blog-ranking algorithm(s) described herein addresses this problem by ranking the blog feeds and blog items. The blog items 104 can be arranged in order by creating a context rank 106 around each blog feed in an OPML document. It is to be understood that this algorithm(s) also can be used for non-OPML blog feed collections as well. A software product equipped with the novel blog ranking algorithm can allow readers to sort their blog feeds in the order of popularity or importance thus effectively reducing content noise.

Illustrated in FIG. 2 is an architectural diagram of system 100 that facilitates generation of the blog context rank 106. More particularly, context rank engine component 102 can employ various factors in determining a blog context rank 106. Although specific factors are illustrated in FIG. 2 with respect to the context rank engine component 102, it is to be understood that all or a subset of these factors can be employed in an algorithmic manner to determine the blog context rank 106. Exemplary algorithms will be described in greater detail infra with reference to the figures that follow.

The context rank engine 102 can employ any desired criteria (e.g., factors) in determining the blog context rank 106. The aspect illustrated in FIG. 2 can employ comments 202, track-backs 204 and blog context factors 206, 208, 210, 212 in determining the blog context rank 106.

As described supra, blog content that is posted onto the Web can be subject to comments 202 and track-backs 204. The subject blog ranking mechanisms (e.g., context rank engine 102) described herein can be employed with any platform that can aggregate content from different sources (e.g., blogs). For example, looking at a specific geographical area (e.g., Seattle area), the context rank engine 102 can be employed to focus, target and deliver more applicable content that is relevant to specific persons and/or groups of people. By way of further example, the context rank engine 102 can facilitate ranking, sorting and/or filtering a large number of blogs down to an amount of blog items that is manageable to a particular reader and/or group of readers.

Conventionally, blogs as a whole are tracked solely on the popularity of the blogger. This popularity index is calculated by determining a number of subscriptions to a blog. In other words, for example, if one BLOG has 200 user subscriptions and another has 10,000 user subscriptions, the second blog will be deemed a more desirable blog since it has a larger number of subscriptions.

This traditional method of ranking blogs presents a problem as it does not look at the particular blog item but rather the blog in an entirety. For example, a problem exists in that, for example, suppose the lower subscription membership blog posts content that is of a great deal more interest today than the content posted on the 10,000 subscription blog today. Traditionally, although the 10,000 subscription blog item is not of more interest in this isolated case, it will be ranked higher solely because of number of subscriptions to the blog. Aspects of the subject context rank engine 102 can facilitate more accurately ranking, filtering and delivering content based upon item context rather than overall subscription statistics.

As such, the subject context rank engine 102 considers the content of the blog item rather than the overall blog and the person behind it. In doing so, the context rank engine 102 can aggregate the blog items 104, rather than the blogs themselves as entities. In doing so, the number of comments 202, track-backs 204 and blog context factors 206, 208, 210, 212 can be employed in an algorithmic manner to rank and sort blog items.

In one aspect, the context rank engine 102 employs an algorithm that facilitates aggregating content of blogs based upon blog context factors 206, 208, 210, 212. More particularly, the context rank engine 102 can consider blog criteria such as location 206, language 208, time 210 and category 212 to target and/or focus blog item 104 dispersion. Thus, the context rank engine 102 can determine blog items 104 more accurately based upon a reader interest or the interest of a group of readers.

As described above, location 206 can be weighed into the algorithm such that a local blog can have a greater weight than a blog from a disparate locale. Similarly, language 208 can also figure into the equation to better focus blog content and delivery thereof. For example, a blog written in the German language would have a lower appeal to an English speaking reader as would an English language blog.

Additionally, temporal factors (e.g., time 210) can be considered to determine content of interest on a given day or time. Moreover, the category 212 of the blog can be considered to assist in intelligently targeting delivery of (and fetching of) the blog items 104. By considering all, or a subset of these factors, the context rank engine 102 can rank the content in each blog item thereby presenting the item in an aggregated format. Although the aforementioned contextual factors are shown in FIG. 2, it is to be understood and appreciated that other factors (e.g., demographics) can be considered and thereafter included into the ranking mechanisms herein. These additional factors are to be considered within the scope of this specification and claims appended hereto.

Figure 3:
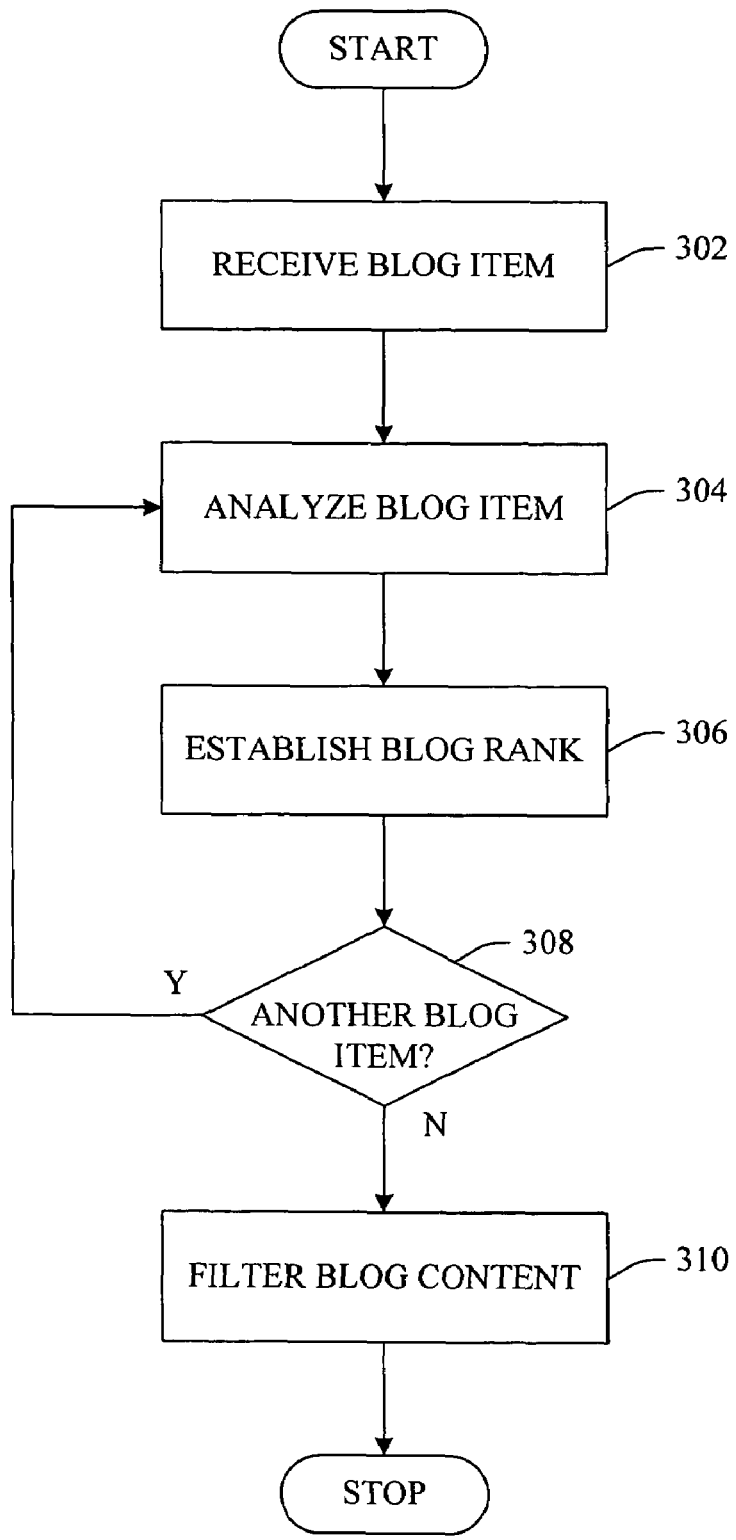
FIG. 3 illustrates an exemplary flow chart of procedures for filtering blog items in accordance with a disclosed aspect.

FIG. 3 illustrates a methodology of ranking a blog item in accordance with an aspect of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

At 302, a blog feed or blog item is received. As described earlier, aspects can employ manual and/or automatic means to receive or fetch a blog item or group of blog items. Once received (or fetched), the item can be analyzed at 304. It will be appreciated that context information (e.g., location, language, time) can be determined as a result of this analysis. Additionally, other factors can be obtained which correspond to the received blog item. For example, comments and/or track-backs can be counted and weighed into a ranking of the subject blog context.

Although aspects described herein are directed to employing a numerical value that represents a number of comments and/or track-backs, it is to be understood that other aspects can employ additional factors with respect to the comments and/or track-backs (e.g., content, author) in determining a rank of a particular blog item. By way of example, applicable comments and/or track-backs can also be analyzed thus establishing a weight in addition to a numerical value of the number of items.

At 306, an algorithm can be applied to establish a blog context rank. As will be better understood upon a review of the figures that follow, algorithmic mechanisms can be employed which apply weight factors to various criteria relating to the particular blog item and content thereof.

A determination is made at 308 which enables a recursive mechanism of rating additional blog items in a feed. If additional blog items are received or fetched, the methodology can return to 304 thereby analyzing the additional blog item. If, on the other hand, additional blog items are not available, the blog content is filtered at 310.

The act of filtering can include filtering, ranking and/or sorting blog items based upon the item-specific context rank established at 306. For example, if a subject blog item has a particular ranking which does not meet or exceed a determined threshold, the blog item can be discarded. In another example, the methodology can return the top (e.g., 10) ranked blog items for a given period. Algorithmic mechanisms of establishing the blog rank at 306 are described in greater detail below.

Figure 4:
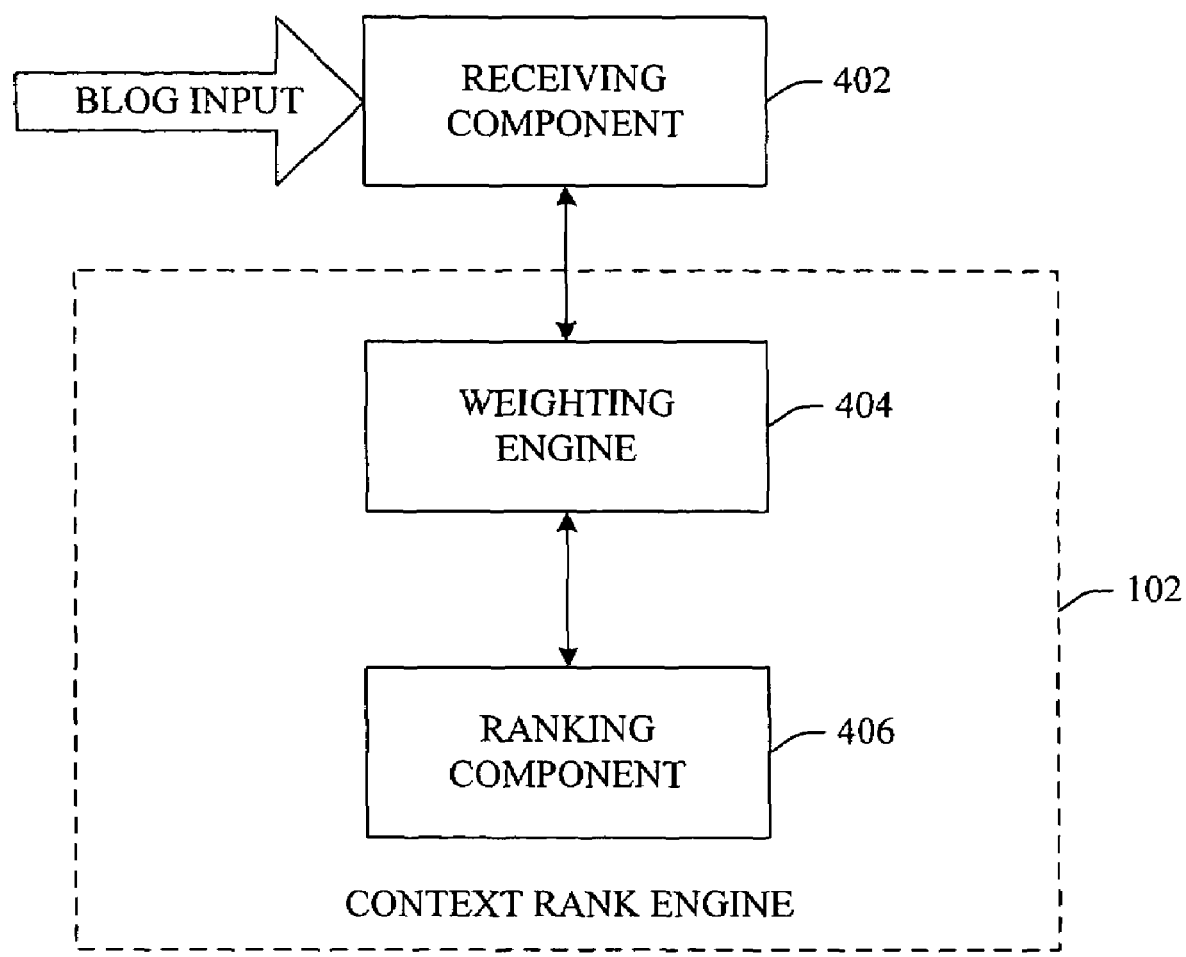
FIG. 4 illustrates a general block diagram of a system that employs a weighting engine and a ranking engine in accordance with an aspect of the subject invention.

Turning now to FIG. 4, a system 400 that facilitates ranking a blog input in accordance with an aspect is shown. Generally, system 400 can include a receiving component 402 and a context rank engine 102. In operation, the receiving component 402 facilitates receiving a blog input (e.g., blog item). The receiving component 402 can also facilitate fetching blog items and/or inputs as desired. In aspects, the receiving component 402 can effect manual retrieval while other aspects employ automated mechanisms via receiving component 402 to receive the blog input(s).

The context rank engine 102 can include a weighting engine 404 and a ranking component 406. The weighting engine 404 can facilitate calculating and/or applying values (e.g., weights) to blog item factors (e.g., comments, trackbacks, and context criteria). The ranking component 406 can employ the output of the weighting engine 404 to thereafter rank, sort and/or filter blog items with respect to other blog items or to a predefined criteria or threshold (e.g., rule). It is to be appreciated that artificial intelligence (AI) reasoning and/or rules-based logic can be employed in connection with the context rank engine 102 and components associated therewith (e.g., weighting engine 404, ranking component 406). These alternative aspects will be described in greater detail with reference to FIGS. 8 and 9 infra.

Figure 5:
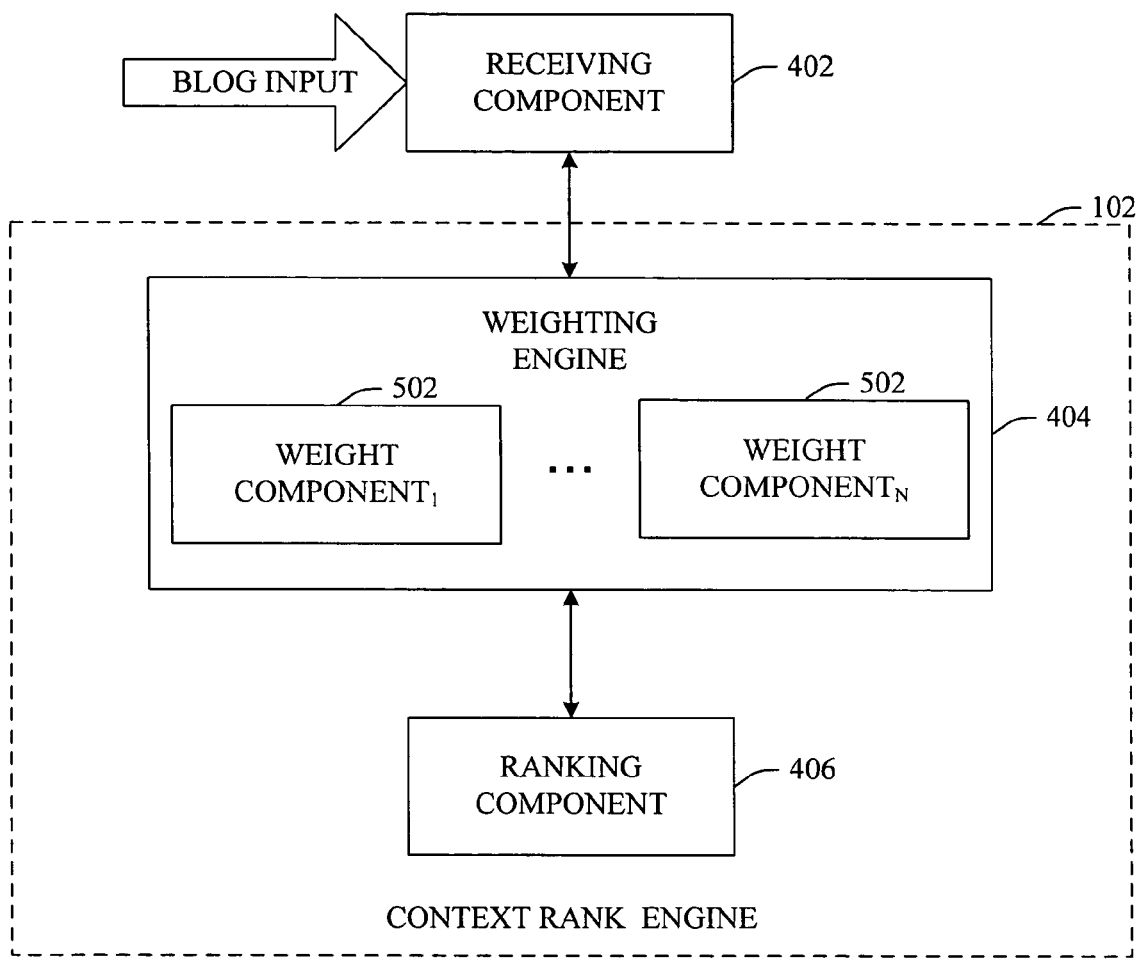
FIG. 5 illustrates a general block diagram that illustrates multiple weight components included within a weighting engine in accordance with an aspect of the subject invention.

Illustrated in FIG. 5 is yet another block diagram of system 400 in accordance with an aspect of the blog ranking mechanisms. In particular, weighting engine 404 can include 1 to N weight components, where N is an integer. It is to be appreciated that weight components 1 to N can be referred to individually or collectively as weight components 502. As described above, aspects can be configured to consider any desired weight factor into an overall rank of a blog item. This rank can be established via ranking component 406 which can employ the weight component(s) 502 thus determining an applicable ranking factor.

Figure 6:
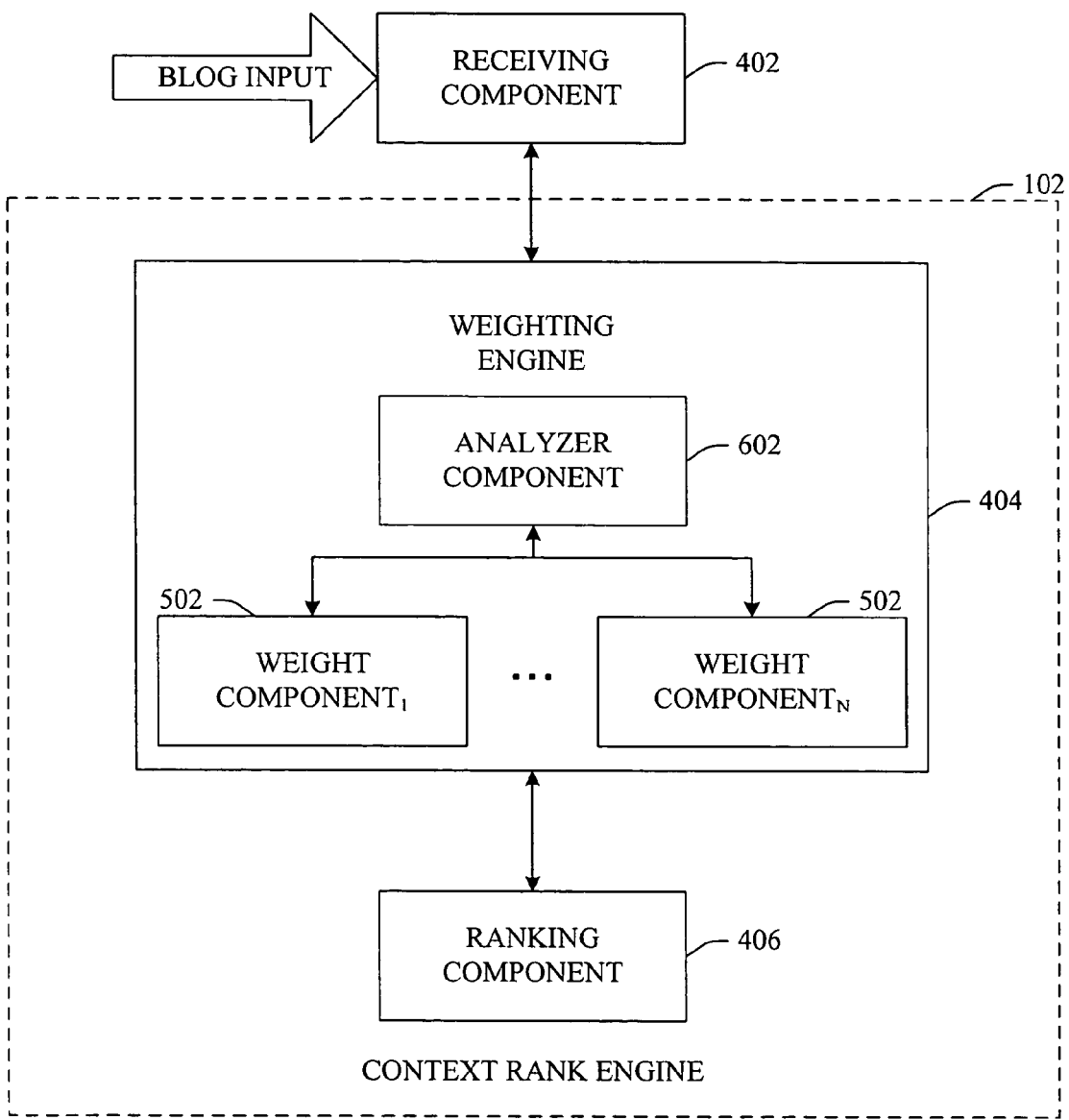
FIG. 6 illustrates a general component block diagram of a system that includes an analyzer component in accordance with an aspect of the subject invention.

Additionally, as illustrated in FIG. 6, the weighting engine 404 can employ an analyzer component 602 that facilitates assignment and/or determination of weight factor(s) 502. For example, the analyzer component 602 can parse and/or determine context criteria (e.g., location, language, time) with respect to a blog input. Additionally, the analyzer component 602 can interrogate additional sources (e.g., Web, disparate blogs) to obtain relevant comment and track-back information as appropriate. Moreover, the analyzer component 602 can be employed to parse a blog feed to identify individual blog items contained within the feed.

The ranking component 406 can employ an output from the weighting engine 404 and accordingly determine an appropriate rank and/or action based at least in part upon a similar criteria from other blog items or pre-determined threshold values.

Figure 7:
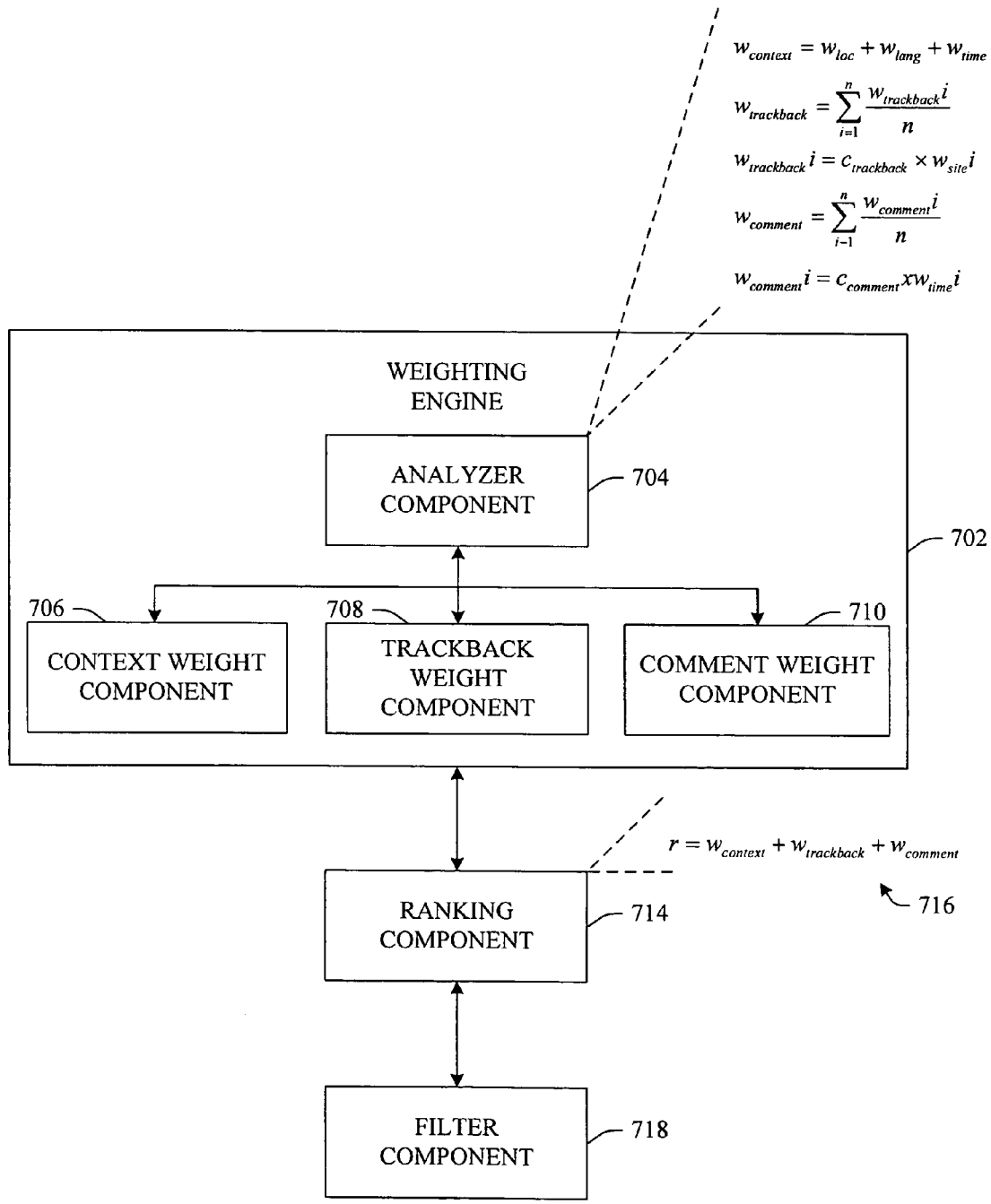
FIG. 7 illustrates a general component block diagram of a system for generating a context rank via exemplary algorithmic mechanisms in accordance with an aspect of the subject invention.

FIG. 7 illustrates a more specific example of a mechanism that ranks a blog item(s) in order to provide context to the invention. It is to be understood and appreciated that, although FIG. 7 illustrates an aspect that employs multiple weights and algorithmic components, other aspects exist that employ additional and/or modified versions as well as a subset of the mathematical algorithms shown. These additional aspects are to be considered within the scope of this invention and claims appended hereto.

With reference now to the aspect shown in FIG. 7, a weighting engine 702 can include an analyzer component 704 that can establish a context weight 706, a track-back weight 708 and a comment weight component 710. More particularly, analyzer component 704 can employ algorithms 712 to effect establishment of the individual weight components, 706, 708, 710. The individual weight components 706, 708, 710 can be employed by the ranking component 714 to calculate an applicable rank with regard to an instant blog input item. More particularly, algorithm 716 can be employed to determine a rank value.

This rank value can be input into a filter component 718 whereby a determination can be made to deliver, retain and/or discard the blog item in view of the calculated ranking. As illustrated in FIG. 7, the analyzer component 714 can employ the algorithms 712 to generate applicable weights (706, 708, 710) which are later employed by the ranking component 714 to establish an item rank.

For example, suppose a user posts an incident in Seattle today. From this original posting, contextual factors (e.g., location, language and time) can be determined via analyzer component 704. In accordance therewith, other users (e.g., readers) can sometimes post a comment. Again, the analyzer component 704 can be employed to count the number of comments posted with regard to any particular blog item.

When people are even more interested in the incident, they sometimes post a related blog entry on a disparate blog that links back to the original blog entry. This is called a trackback. In operation, this track-back can sometimes have more weight than a comment because the person felt the need to extend the discussion or to extend the concept of the original entry posted today. Therefore, it can carry more weight than the simple comment. In any case, the track-backs can be tallied (e.g., via analyzer component 704).

Considering all of the interest around each blog item in the terms of context, comment weight and track-back weight, the system 700 can employ algorithms 712 and 716 thereby expressing the interest and/or value as a number (e.g., ranking). Accordingly, the filter component 718 can compare an individual ranking value with ranking values of other blog items. Thus, the numbers can be sorted and aggregated by the filter component 718 at any given time. It is to be understood that blog items can be rendered (e.g., displayed) in any given format.

In operation, an aspect can receive a blog feed. Accordingly, the analyzer component 704 can fetch the hypertext markup language (HTML) content that corresponds to each blog item included within the feed. The analyzer component 704 can facilitate searching for the comments, track-backs and time stamps associated to the blog item. Once the information is gathered, the individual weights (e.g., 706, 708, 710) are calculated via algorithms 712. The ranking component 714 can employ the weights via algorithm 716 to facilitate calculation of an overall rank value. It will be appreciated that the empirical values, e.g., $c_{track-back}$, and the constant for the comment, $c_{comment}$ can be any desired and/or suitable mathematical value.

The following example is provided to assist in an understanding of the calculation of an overall ranking value. By way of example, suppose a user is located in Seattle and is looking for interesting content with respect to the Seattle area. In this example, location would be taken into consideration as one of the weighting factors in determining the context weight component 706. In doing so, the ranking system can take into account the distance from a blog location to a user location. Therefore, if the location delta is large (e.g., Pittsburgh from Seattle), the content of a particular blog from Pittsburgh may not be considered into the aggregated content for a particular area (e.g., Seattle). It is to be understood that the location weighting factor can prohibit inclusion of this blog even if it is a very interesting blog item in the Pittsburgh area.

As described above, location, language and time are contextual factors that can be considered into the context weight component 706. For example, if the blog is written in German, the applicable weight would be much lower to an English speaking person as would an English blog item. As shown in the exemplary algorithms 712, the overall context component is the sum of weight factors associated to location, language and time. Additionally, track-back values and comments are considered and can be calculated via algorithms 712.

In one exemplary aspect, the ranking system employs a mechanism (e.g., directory) where people can manually submit their blogs together with location information that corresponds to the publishing location of the blog. In this aspect, blogs can be aggregated with respect to a specific location.

Accordingly, a crawler can be employed that can access each blog and read the content therein. Once the information is gathered for each blog, the blog items can be ranked, compared, filtered and/or sorted. The resultant set of blog items can be presented to a user and can represent items focused to a particular target audience. Effectively, this resultant set of blog items can be a snapshot of all blogs from a particular area and/or can represent blogs of particular interest to a user.

As described supra, the blog-rank algorithm can calculate a context rank for each blog item from each subscribed feed. In accordance therewith a user can employ a reader to filter the unnecessary content.

As illustrated in FIG. 7, in one aspect, a user can employ algorithms 712, 716 to generate a blog context rank. More particularly, for each blog item received, a generic weighted context can be created by identifying location of the blog, category of the blog and other contextual information such as freshness (e.g., date published), language, etc. An equivalent weight for this generic context can be calculated using the following algorithm.

$$w_{context} = w_{loc} + w_{lang} + w_{time}$$

For each track-back of the blog item an associated weight can be calculated. It will be appreciated that a track-back is a link to the blog item from an external web site. Each track-back weight can vary depending on the track-back origin. For example, a track-back from a "regular" blog can carry a weight of x. By contrast, a track-back from a popular website can carry a weight of 10x. Accordingly, a cumulative track-back weight can be calculated for the blog item.

$$w_{trackback} = \sum_{i=1}^{n} \frac{w_{trackback} i}{n}$$

where, $$w_{trackback} i = c_{trackback} x w_{site} i$$

Similarly, for each comment on the blog item, a pre-calculated weight can be assigned and a cumulative comment weight can be calculated for the blog item at the end.

$$w_{comment} = \sum_{i=1}^{n} \frac{w_{comment} i}{n}$$

where, $$w_{comment} i = c_{comment} x w_{time} i$$

The above three components, context weight component 706, track-back weight component 708 and comment weight component 710 can generate the blog context rank. The blog context rank can be employed to sort the blog items to "bubble up" importance and/or popularity. The following equation gives the actual rank of a blog:

$$r = w_{context} + w_{trackback} + w_{comment}$$

Figure 8:
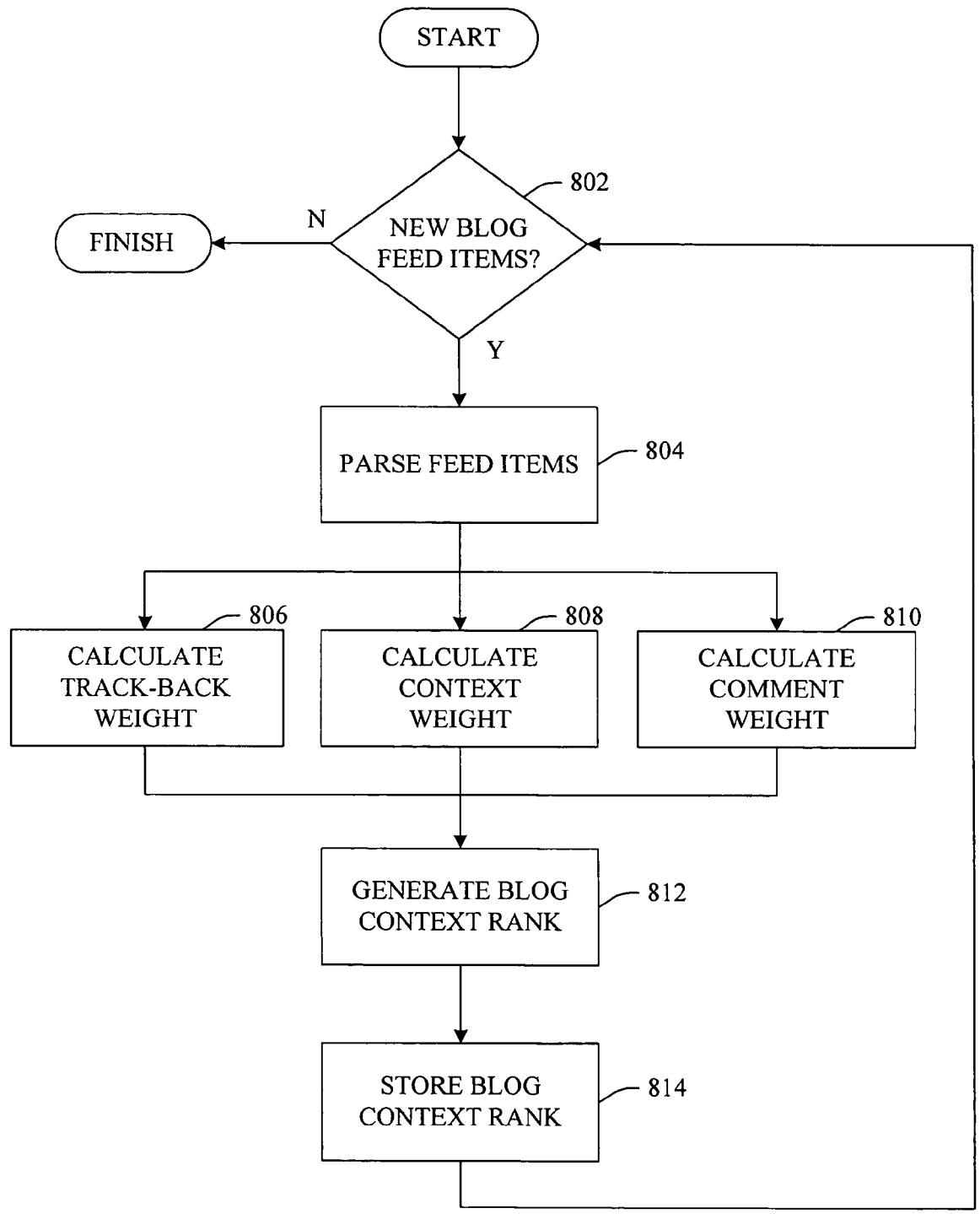
FIG. 8 illustrates an exemplary flow chart of procedures for calculating a context rank of blog items in accordance with a disclosed aspect.

FIG. 8 illustrates a methodology of computing a blog item context rank in accordance with an aspect of the invention. More particularly, FIG. 8 illustrates a summarization of algorithm 716 in accordance with an aspect of the blog context rank. Initially, at 802 a determination is made if new blog feed items are present. If not, a stop block is reached. If new blog feed items are present, at 804, the items are parsed. At 806, 808 and 810, a track-back weight, context weight and comment weight is calculated respectively. It is to be understood and appreciated that the calculation of these weights can occur in any order.

A blog context rank is generated at 812. Effectively, the weights can be added to establish the blog context rank. The established blog context rank can be stored for the particular blog item at 814. As illustrated, the methodology is recursive. In other words, once a context rank is established for a blog item, the methodology returns to 802 where a determination is made if additional blog items exist. If so, another blog context rank is determined and stored for the new item(s). If not, a stop block is reached.

Once stored, it will be appreciated that the blog items can be aggregated, sorted and/or filtered based at least in part upon the blog context rank. It will be understood that these mechanisms and methodologies can facilitate identification and delivery of more focused blog content based upon location, interest, time, popularity, etc.

It should be understood that the blog context rank described herein is fundamentally different from any conventional ranking mechanisms. For example, search engines only rank content for popularity. This means that the traditional search engine ranking mechanisms do not take any of the location, category and contextual information into consideration for ranking the content. To the contrary, the novel aspects of the subject blog-rank algorithm and mechanisms consider associated contextual information to incorporate importance (and other criteria) on top of popularity.

Figure 9:
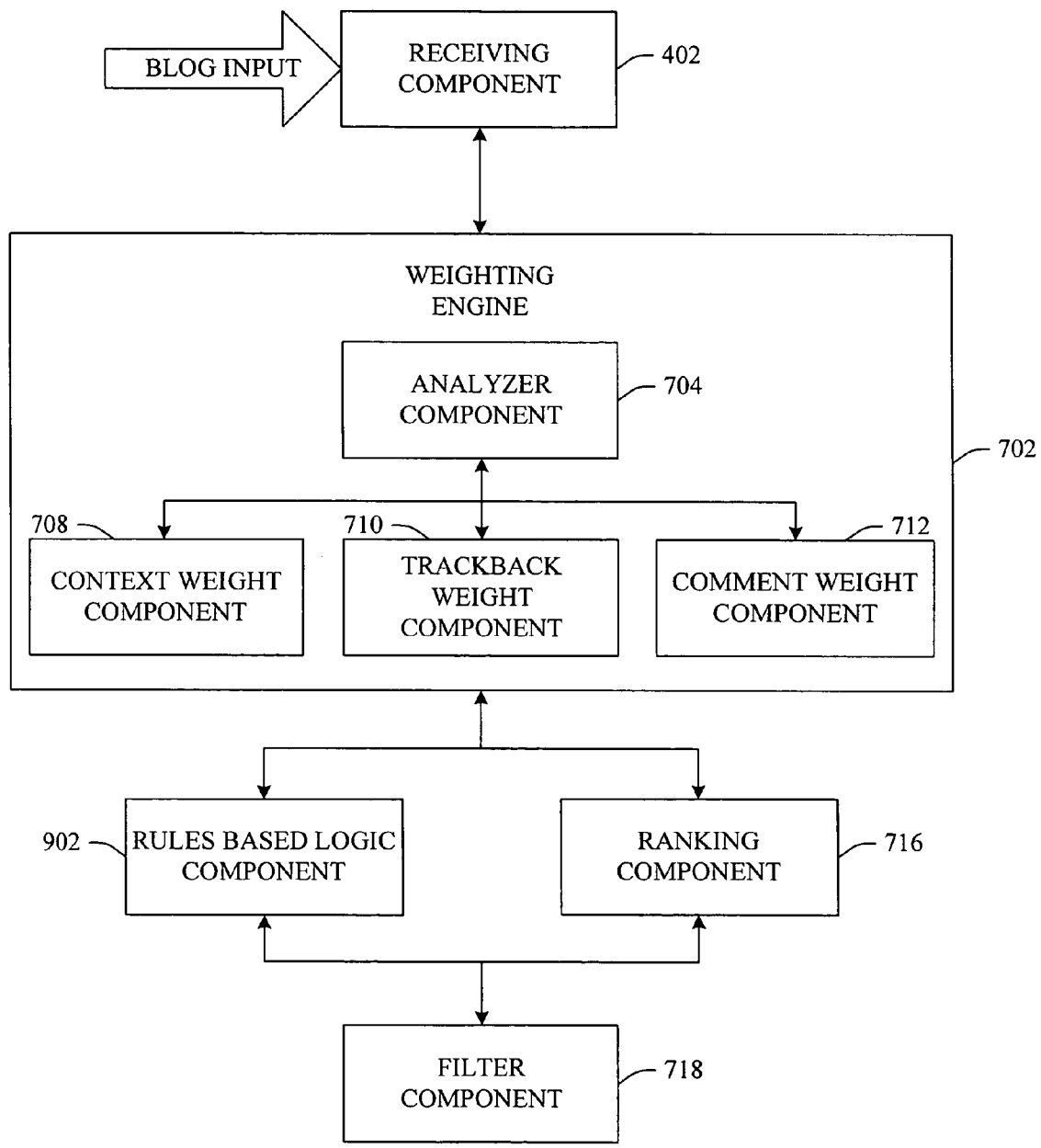
FIG. 9 illustrates a blog item ranking system that includes rule-based mechanisms in accordance with an aspect of the invention.

With reference now to FIG. 9, an alternate aspect of a blog item context ranking system 900 is shown. In particular, system 900 includes a rule based logic component 902. In accordance with this alternate aspect, an implementation scheme (e.g., rule) can be applied to define and/or implement a ranking scheme. It will be appreciated that the rule-based implementation can define constants, weights and/or thresholds associated with ranking, sorting and filtering blog items. In response thereto, the rule-based implementation can facilitate selection of blog items based upon the calculated blog context rank(s) by employing a predefined and/or programmed rule(s) based upon any desired criteria.

It will be appreciated that any of the specifications utilized in accordance with the subject invention can be programmed into a rule-based implementation scheme. In the exemplary aspect of FIG. 9, the rule based logic component 902 can be programmed or configured in accordance with any user-defined preference.

Figure 10:
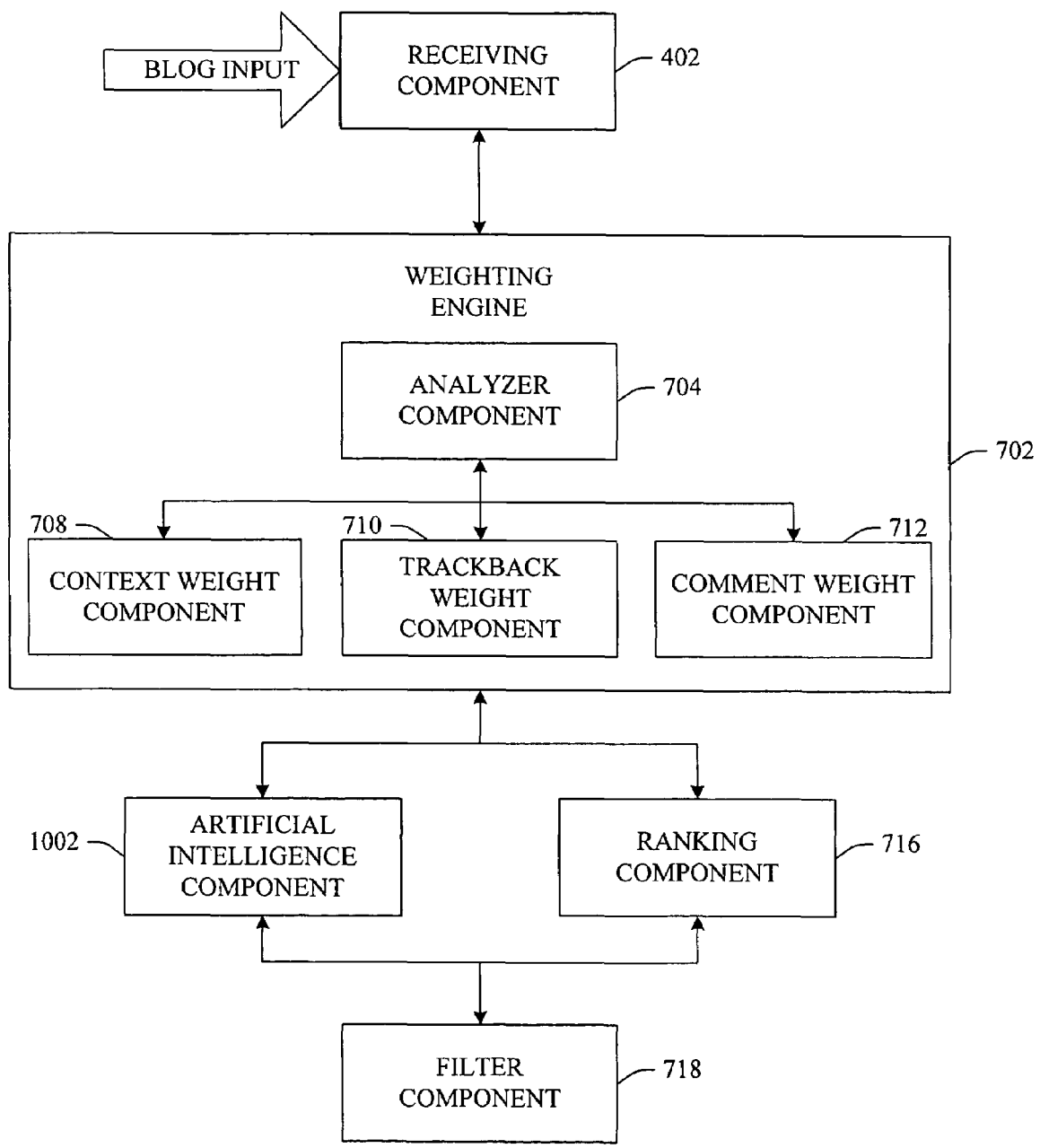
FIG. 10 illustrates a blog item ranking system that includes artificial intelligence-based mechanisms in accordance with an aspect of the invention.

FIG. 10 illustrates a blog item ranking system 1000 that employs an AI component 1002 which facilitates automating one or more features in accordance with the subject innovation. It is to be understood that this AI component 1002 can be employed in addition to, or in place of the rules-based logic component 902 shown in FIG. 9.

The subject invention (e.g., in connection with ranking) can employ various AI-based schemes for carrying out various aspects thereof. For example, a process for determining a user preference to be employed in the weighting process can be facilitated via an automatic classifier system and process.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. In the case of blog item context ranking, for example, attributes can be word or phrases or other data-specific attributes derived from the words (e.g., presence of key terms), and the classes are categories or areas of interest (e.g., levels of priorities).

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the specification herein, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when a particular criteria should be given special weight, when to discard a blog item, when to deliver a blog item, what a user preference is with respect to blog item content at a given time, etc.

Figure 11:
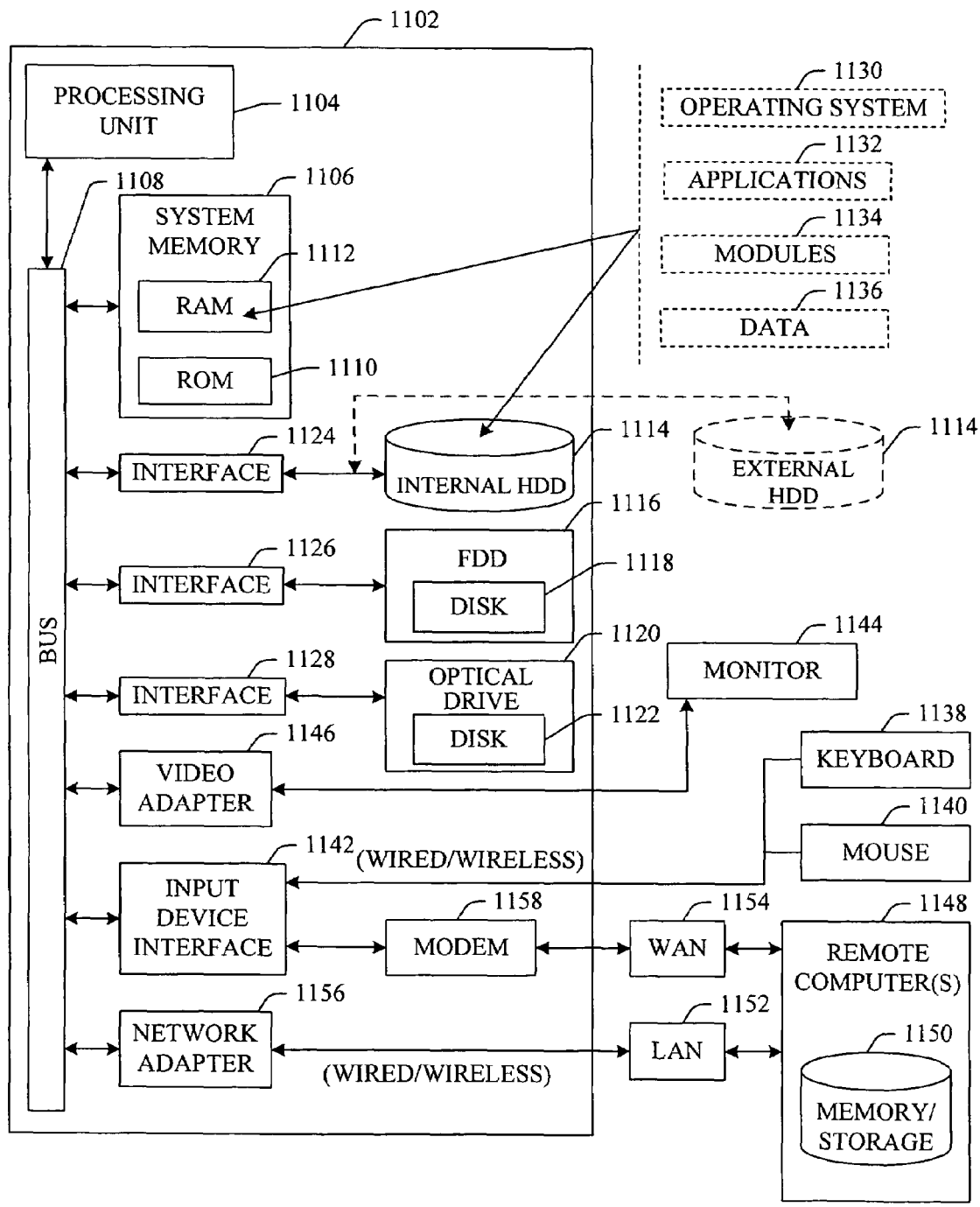
FIG. 11 illustrates a block diagram of a computer operable to execute the disclosed architecture.

Referring now to FIG. 11, there is illustrated a block diagram of a computer operable to execute the disclosed architecture with respect to ranking blog item context. In order to provide additional context for various aspects of the subject invention, FIG. 11 and the following discussion are intended to provide a brief, general description of a suitable computing environment 1100 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

With reference again to FIG. 11, the exemplary environment 1100 for implementing various aspects of the invention includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject invention.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the invention can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (*a*, *b*, *g*, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
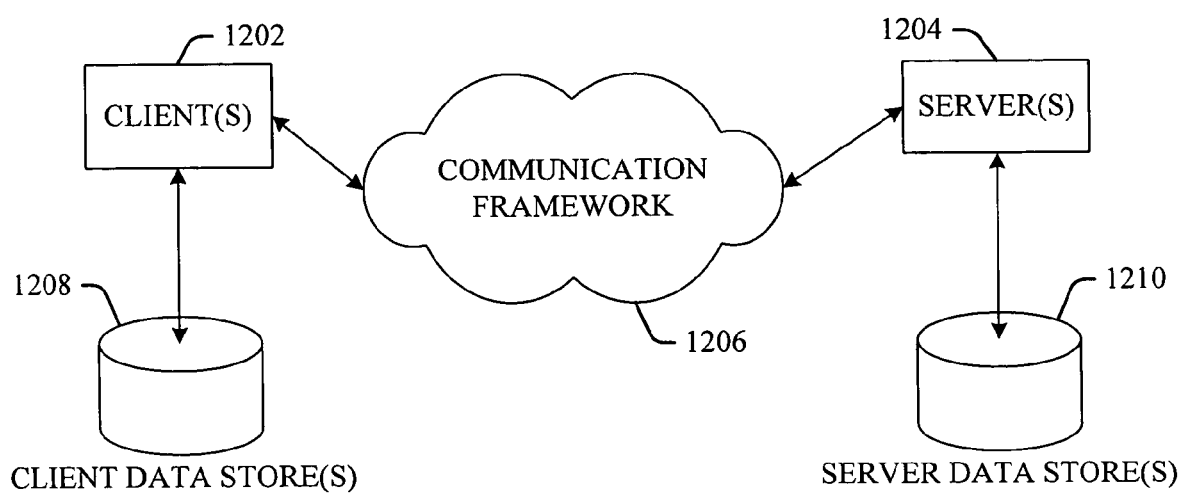
FIG. 12 illustrates a schematic block diagram of an exemplary computing environment in accordance with the subject invention.

Referring now to FIG. 12, there is illustrated a schematic block diagram of an exemplary computing environment 1200 in accordance with the subject blog context ranking mechanism(s). The system 1200 includes one or more client(s) 1202. The client(s) 1202 can be hardware and/or software (e.g., threads, processes, computing devices). The client(s) 1202 can house cookie(s) and/or associated contextual information by employing the invention, for example.

The system 1200 also includes one or more server(s) 1204. The server(s) 1204 can also be hardware and/or software (e.g., threads, processes, computing devices). The servers 1204 can house threads to perform transformations by employing the invention, for example. One possible communication between a client 1202 and a server 1204 can be in the form of a data packet adapted to be transmitted between two or more computer processes. The data packet may include a cookie and/or associated contextual information, for example. The system 1200 includes a communication framework 1206 (e.g., a global communication network such as the Internet) that can be employed to facilitate communications between the client(s) 1202 and the server(s) 1204.

Communications can be facilitated via a wired (including optical fiber) and/or wireless technology. The client(s) 1202 are operatively connected to one or more client data store(s) 1208 that can be employed to store information local to the client(s) 1202 (e.g., cookie(s) and/or associated contextual information). Similarly, the server(s) 1204 are operatively connected to one or more server data store(s) 1210 that can be employed to store information local to the servers 1204.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer readable storage medium comprising a system that facilitates ranking weblog (blog) item content, comprising:
   a data reception component that receives data relating to a blog item;
   an engine that constructs a weight relating to the data;
   an analyzer component that identifies at least one link to the blog item from a disparate source, the engine factors the at least one link into the track-back weight, the track-back weight is calculated using $$w_{trackback} = \sum_{i=1}^{n} \frac{w_{trackback}i}{n}, \text{ where } w_{trackback}i = c_{trackback} \times w_{site}i$$

and n represents a number of links to the blog item, $C_{track-back}$ is a constant for the track-back, the analyzer component further identifies at least one comment associated to the blog item, the engine factors the at least one comment into the comment weight, the comment weight is calculated using an $$w_{comment} = \sum_{i=1}^{n} \frac{w_{comment}i}{n}, \text{ where } w_{comment}i = c_{comment}xw_{time}i$$

and n represents a number of comments on the blog item, $C_{comment}$ is a constant for the comment; and
   a ranking component that ranks the blog item based at least in part upon the comment weight and track-back weight.

2. The system of claim 1, further comprising an analyzer component that identifies a location that relates to the blog item, the engine factors the location into the context weight.

3. The system of claim 2, the analyzer component identifies a language that relates to the blog item, the engine factors the language into the context weight.

4. The system of claim 3, the analyzer component identifies a temporal factor that relates to the blog item, the engine factors the temporal factor into the context weight.

5. The system of claim 1, further comprising a filtering component that facilitates excluding a subset of the data based at least in part upon the weight so as to facilitate elimination of content noise.

6. The system of claim 5, wherein the filtering component excludes the subset by utilizing an implicitly trained classifier that infers a type of blog item desired by a user.

7. The system of claim 6, further comprising a rendering component that outputs the subset to a target user.

8. The system of claim 1, wherein the engine is a search engine.

9. A method for ranking blog content comprising:
   receiving and recognizing a blog feed;
   parsing the blog feed to identify a plurality of blog items;
   obtaining a context criteria that corresponds to each of the blog items;
   generating a weight that corresponds to each of the plurality of blog items, the weight is based at least in part upon the context criteria;
   excluding a subset of the blog items based at least in part upon the weight so as to facilitate elimination of content noise;
   calculating a track-back weight using $$w_{trackback} = \sum_{i=1}^{n} \frac{w_{trackback}i}{n}, \text{ where } w_{trackback}i = c_{trackback} \times w_{site}i$$

and n represents a number of links to a particular blog item, $C_{track-back}$ is a constant for the track-back, the track-back weight is factored into the weight;
   calculating a comment weight using $$w_{comment} = \sum_{i=1}^{n} \frac{w_{comment}i}{n}, \text{ where } w_{comment}i = c_{comment}xw_{time}i$$

and n represents a number of comments on the blog item, $C_{comment}$ is a constant for the comment, the comment weight is factored into the weight; and
   ranking the plurality of blog items based at least in part upon the weight.

10. The method of claim 9, further comprising identifying at least one of a location, a language and temporal value that relates to each of the blog items and factoring the identified location, language and temporal value into a context weight, the context weight is factored into the weight.

11. A computer readable storage medium comprising a system that facilitates ranking blog item content, comprising;
   means for receiving a blog item;
   means for analyzing the blog item;
   means for generating a context weight that corresponds to the blog item;
   means for generating a track-back weight that corresponds to the blog item calculating a trackback weight using is $$w_{trackback} = \sum_{i=1}^{n} \frac{w_{trackback}i}{n}, \text{ where } w_{trackback}i = c_{trackback}xw_{time}i.$$

and n represents a number of links to the blog item, $C_{track-back}$ is a constant for the track-back;
   means for generating a comment weight that corresponds to the blog item, calculating the comment weight using $$w_{comment} = \sum_{i=1}^{n} \frac{w_{comment}i}{n}, \text{ where } w_{comment}i = c_{comment} \times w_{time}i,$$

n represents a number of comments on the blog item, $C_{comment}$ is a constant for the comment;
   means for generating a sum of the context weight, the track-back weight and the comment weight; and
   means for ranking the sum against at least one disparate sum that corresponds to a disparate blog item.

* * * * *